(12) United States Patent
Gray

(10) Patent No.: US 9,560,716 B2
(45) Date of Patent: Jan. 31, 2017

(54) DEVICE FOR PROTECTING A LOW VOLTAGE LED DIRECT DRIVER

(71) Applicant: Richard Landry Gray, Saratoga, CA (US)

(72) Inventor: Richard Landry Gray, Saratoga, CA (US)

(73) Assignee: BEIJING EFFILED OPTO-ELECTRONICS TECHNOLOGY CO., LTD, Song Fang Yuan, Shangdixili, Haidian Dist., Beijing (CN)

( * ) Notice: Subject to any disclaimer, the term of this patent is extended or adjusted under 35 U.S.C. 154(b) by 0 days.

(21) Appl. No.: 14/583,106

(22) Filed: Dec. 25, 2014

(65) Prior Publication Data

US 2015/0208481 A1    Jul. 23, 2015

Related U.S. Application Data

(60) Provisional application No. 61/920,611, filed on Dec. 24, 2013.

(51) Int. Cl.
*H05B 33/08* (2006.01)

(52) U.S. Cl.
CPC ........ *H05B 33/0887* (2013.01); *H05B 33/083* (2013.01); *H05B 33/0815* (2013.01); *Y02B 20/341* (2013.01)

(58) Field of Classification Search
CPC ... H05B 33/08; H05B 33/0815; H05B 33/083; H05B 33/0887; H05B 33/0839; H05B 33/0803; H05B 33/0806
USPC ........ 315/185 R, 186, 192, 200 R, 291, 294, 315/297, 307, 308
See application file for complete search history.

(56) References Cited

U.S. PATENT DOCUMENTS

| | | | | |
|---|---|---|---|---|
| 2010/0109537 A1* | 5/2010 | Nishino | ............. | H05B 33/0827 315/185 R |
| 2010/0134018 A1* | 6/2010 | Tziony | ................. | H05B 33/083 315/122 |
| 2013/0043799 A1* | 2/2013 | Siu | ..................... | H05B 33/0824 315/193 |

* cited by examiner

*Primary Examiner* — Thai Pham

(57) ABSTRACT

A device for protecting a low voltage LED direct driver comprises a rectifying stage, a major string, a minor string, a high voltage NFE, a pull-up resistor, and an avalanche unit (zener diode or equivalent component). The high voltage NFET has a gate, a drain and a source. The drain of the high voltage NFET is connected to a bottom end of the major string, the source of the high voltage NFET is connected to a top of the minor string. The pull-up resistor is connected between the gate of the high voltage NFET. The avalanche unit has a first end and a second end. The first end of the avalanche unit is connected to the gate of the high voltage NFET and the pull-up resistor. High voltage NFET is placed just above the low voltage LED direct driver and biased, which provides excellent voltage protection for the low voltage LED direct driver.

4 Claims, 5 Drawing Sheets

DEVICE FOR PROTECTING A LOW VOLTAGE LED DIRECT DRIVER

This application claims priority benefit under 35 USC 119 of provisional patent application Ser. No. 61/920,611 filed 24 Dec. 2013.

FIELD OF THE INVENTION

Embodiments of the present disclosure relate to a protection circuit, and especially toward devices for protecting a low voltage LED direct driver from over-voltage.

BACKGROUND

Direct Drivers for LED lamps are popular for their low cost, low EMI and high efficiency. The general operating principle of these low voltage LED direct drivers is that they are able to reconfigure the overall number of LED diodes in a large LED string. The number of powered LED diodes, with a proper design, is always the optimal amount for any combination of input voltage, LED temperature, LED current and LED forward voltage variation.

However, problems always occur when the operating conditions are outside the normal window, for instance if a user plugs a 120 V LED lamp into a 220 V socket, the circuit inside the LED lamp may be damaged due to the over-voltage condition of the input voltage. Therefore, there is still a need to provide adequate safeguards to maintain product and user safety for operating under some abnormal conditions.

SOME EXEMPLARY EMBODIMENTS

These and other needs are addressed by the present disclosure, wherein an approach is provided for devices that protect a low voltage LED direct driver from over-voltage conditions.

According to one aspect of an embodiment of the present disclosure, the device for protecting a low voltage LED direct driver comprises a rectifying stage, a major string, a minor string, a high voltage NFET, a pull-up resistor, and an avalanche unit (zener diode or equivalent type of controlled breakdown component). The high voltage NFET has a gate, a drain and a source. The drain of the high voltage NFET is connected to a bottom end of the major string, the source of the high voltage NFET is connected to a top of the minor string. The pull-up resistor is connected to the gate of the high voltage NFET. The zener diode has a first end and a second end. The first end of the zener diode is connected to the gate of the high voltage NFET and the pull-up resistor. The high voltage NFET is placed just above the low voltage LED direct driver, which provides excellent voltage protection for the low voltage LED direct driver.

BRIEF DESCRIPTION OF THE DRAWINGS

The disclosure is illustrated by way of example, and not by way of limitation, in the figures of the accompanying drawings in which like reference numerals refer to similar elements and in which.

DESCRIPTION OF THE PREFERRED EMBODIMENT

Embodiments of the apparatus and/or methods are disclosed. In the following description, for purposes of explanation, numerous specific details are set forth in order to provide a thorough understanding of the embodiments of the disclosure. It is apparent, however, to one skilled in the art, that the present disclosure may be practiced without these specific details or with an equivalent arrangement.

Figure 1:
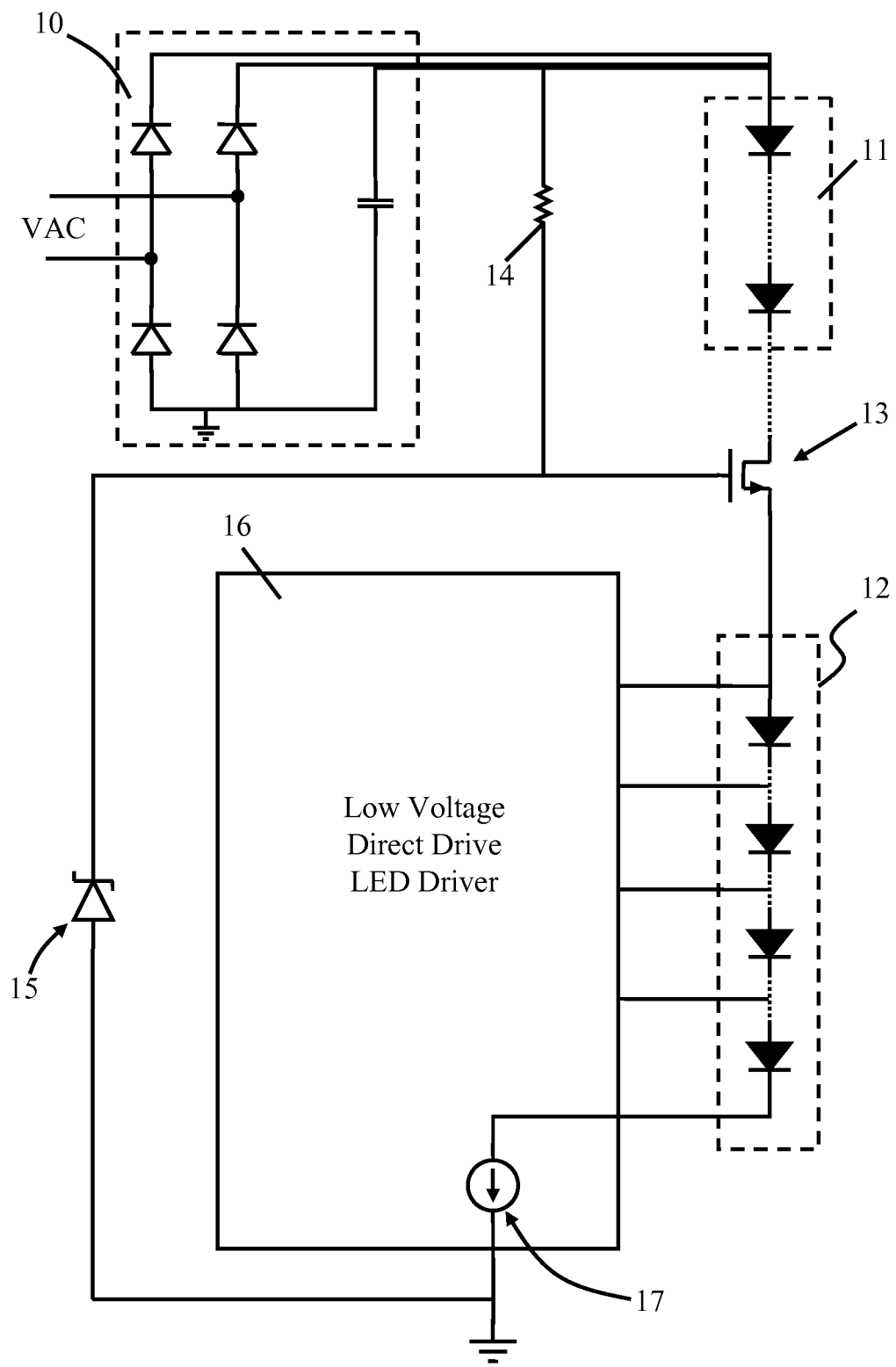
FIG. 1 is a circuit diagram a device for protecting a low voltage LED direct driver from over-voltage in accordance with an embodiment of the present disclosure.

With reference to FIG. 1, FIG. 1 is a circuit diagram of a device for protecting a low voltage LED direct driver from over-voltage in accordance with an embodiment of the present disclosure. In this embodiment, the device comprises a rectifying stage 10, a major string 11, a minor string 12, a high voltage NFET 13, a pull-up resistor 14, and a zener diode 15. The rectifying stage 10 rectifies a AC input voltage to a pulsating DC voltage. A top end of the major string 11 is connected to the rectifying stage 10. The minor string 12 is connected to the low voltage LED direct driver 16 and a current source 17 integrated inside the low voltage LED direct driver 16. The high voltage NFET 13 has a gate, a drain and a source. The drain of the high voltage NFET 13 is connected to a bottom end of the major string 11, the source of the high voltage NFET 13 is connected to a top of the minor string 12. The pull-up resistor 14 is connected between the gate of the high voltage NFET 13. The zener diode 15 has a first end and a second end. The first end of the zener diode 15 is connected to the gate of the high voltage NFET 13 and the pull-up resistor 14. The second end of the zener diode 15 is connected to the current source 17 of the low voltage LED direct driver 16.

This embodiment, shown in FIG. 1, provides excellent protection for the low voltage LED direct driver. The high voltage NFET 13 is placed in series with LED string (i.e., the major string 10 and the minor string 12) just above the low voltage LED direct driver and biased so that the source of the NFET 13 never exceeds a safe operating voltage. The high voltage NFET 13, with a 600 volt breakdown voltage, is easy to obtain at reasonable cost.

Although the high voltage NFET 13 provides excellent protection for the direct driver during over-voltage conditions, the power and heat dissipated by the NFET could become enormous when the input voltage goes to a high voltage while the LED current maintains a high value. The heat from the high voltage NFET 13 during these conditions may be enough to damage itself or surrounding circuitry. One solution to this problem is to lower the current of the LED string during over-voltage situations, effectively lowering the NFET power dissipation. As a consequence of lowering the LED current, the LED light output will also decrease significantly, but this is more of a benefit than a problem since it will provide notification to the user that there is a problem, while still providing some small amount of light for emergency situations.

Accordingly, the embodiment shown in FIG. 1 may further comprise a thermal sensing unit added to the low voltage LED direct driver 16, which senses an operating temperature of the low voltage LED direct driver 16. The low voltage LED direct driver 16 is then able to adjust LED string current to the sensed operating temperature based on a predetermined rule. For example, the low voltage LED direct driver 16 can make the LED string current decrease immediately to zero when the sensed operating temperature exceeds a certain threshold temperature.

Figure 2:
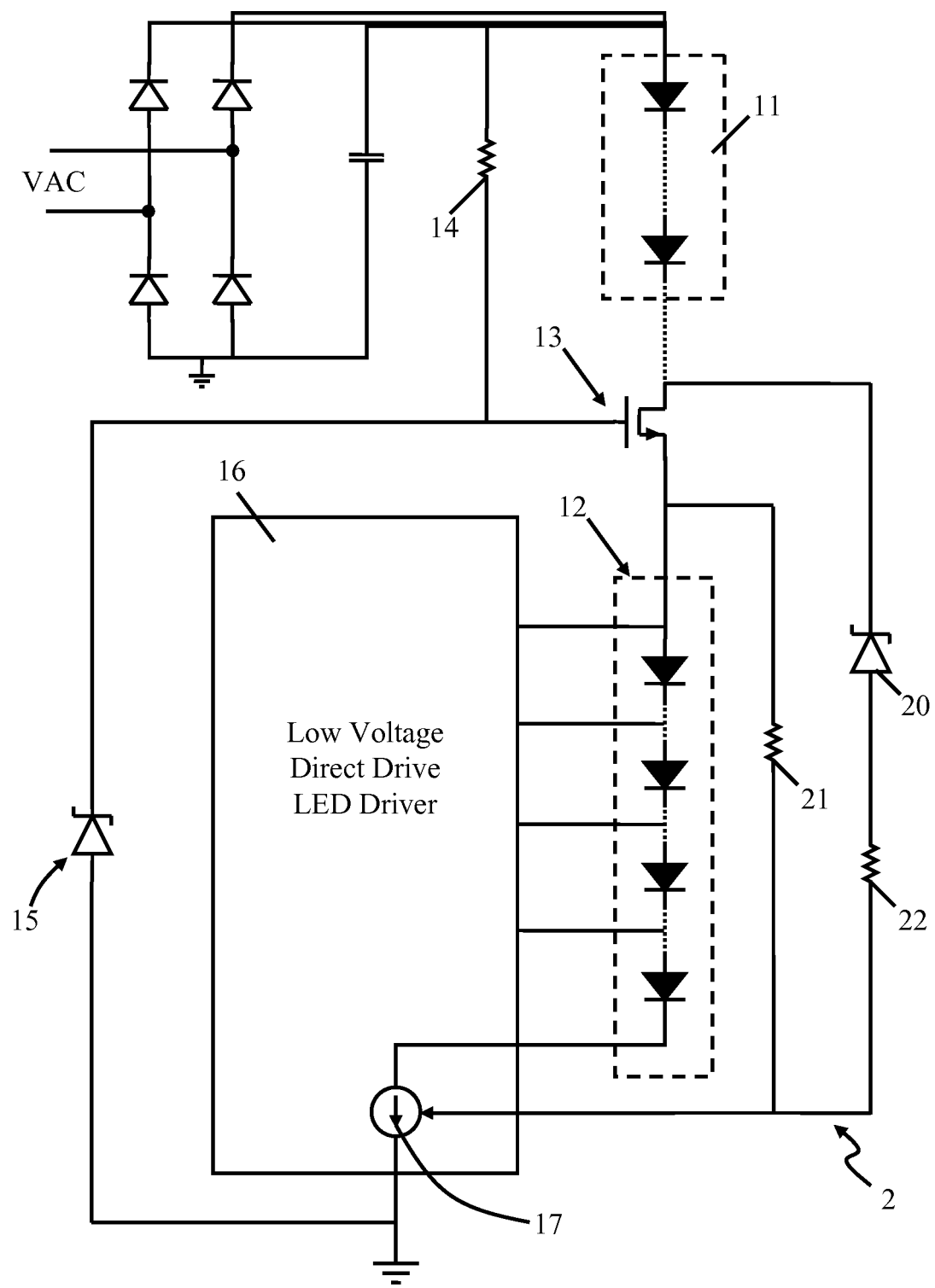
FIG. 2 shows a diagram of an embodiment for decreasing LED current based on the embodiment of FIG. 1.

With further reference to FIG. 2, FIG. 2 shows a diagram of an embodiment for decreasing LED current based on the embodiment of FIG. 1. In this embodiment, as shown in FIG. 2, an external feedback module 2 is added to the embodiment of FIG. 1, which sends a current back to the current source 17. The feedback current is a function of the voltage at the drain of the high voltage NFET 13. As shown in FIG. 2, the external feedback module 2 comprises a zener diode 20, a first feedback resistor 21, a second feedback resistor 22. The first feedback resistor 21 is connected between the source of the high voltage NFET 13 and the current source 17 of the low voltage LED direct driver 16. The zener diode 20 has a cathode and an anode. The cathode of the turning zener diode 20 is connected to the drain of the high voltage NFET 13. The second feedback resistor 22 is connected to the current source 17 of the low voltage LED direct driver 16.

An increase in the voltage across the minor LED string results in an increase in feedback current through the first feedback resistor 21 to the current source 17. The current source 17 senses the increase in feedback current and decreases the LED current appropriately. The feedback path through resistor 21 is primarily used to stabilize the LED power output as the input supply voltage changes. The zener diode 20 and the second feedback resistor 22 also sends current to the current source 17. This feedback current is a function of the voltage at the drain of the high voltage NFET 13. When the voltage at the drain of NFET 13 exceeds the breakdown voltage of the zener diode 20, a large current may flow through resistor 22, limiting the LED current to a value low enough so the power dissipation in the NFET is not a problem.

Figure 3:
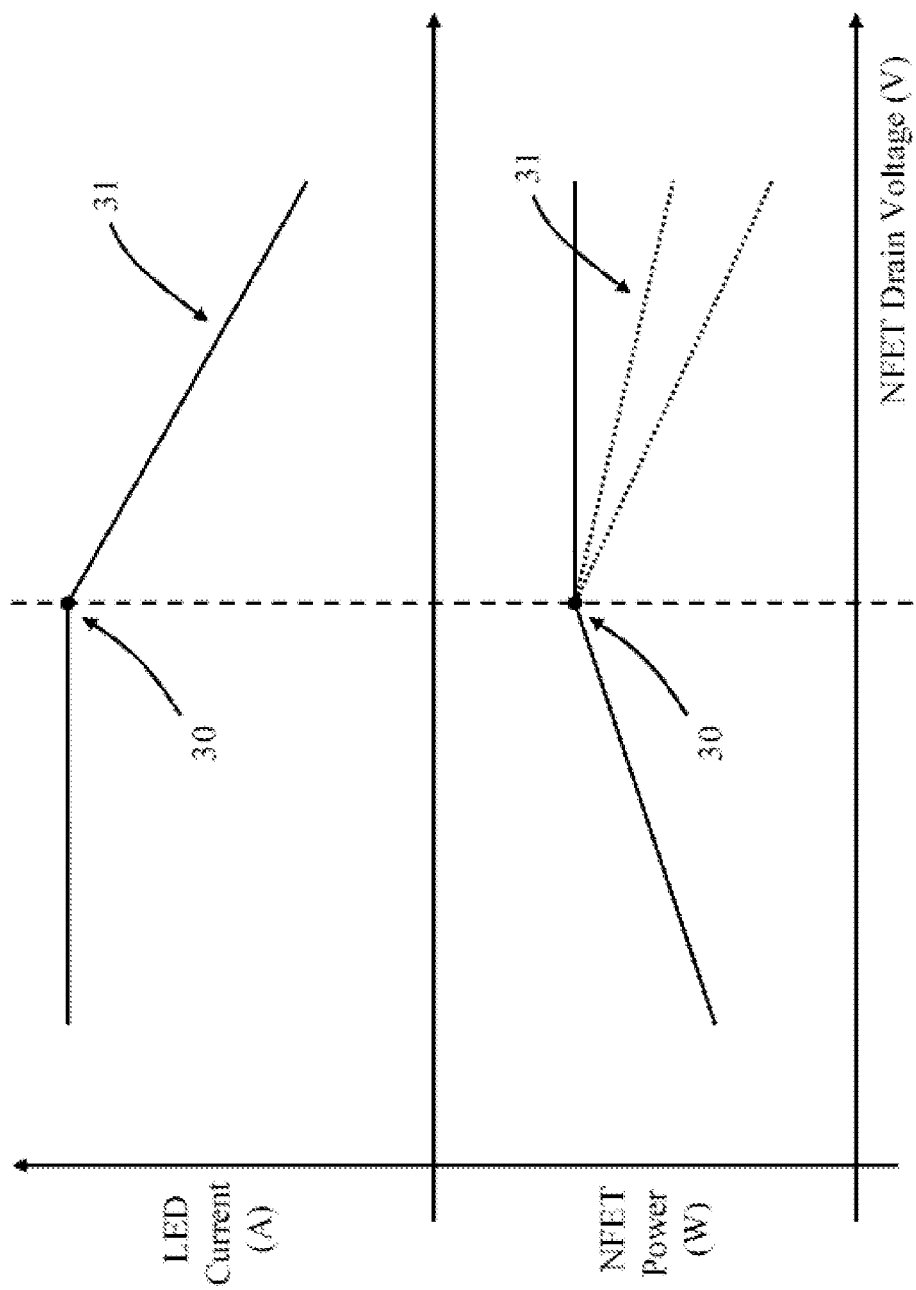
FIG. 3 is a diagram of curves showing the relations of LED current, power of the high voltage NFET to the voltage at the drain of the high voltage NFET.

FIG. 3 is a collection of curves showing the relations of LED current and power of the high voltage NFET 13 to the voltage at the drain of the high voltage NFET 13. As shown in FIG. 3, the point 30 is determined by the breakdown voltage of the zener diode 20 along with the increase of the drain voltage of the high voltage NFET 13. The slope 31 of the LED current is determined by the resistance of the second feedback resistor 22. The amount of power decrease of the high voltage NFET 13 depends on the slope 31 of the LED current.

Figure 4:
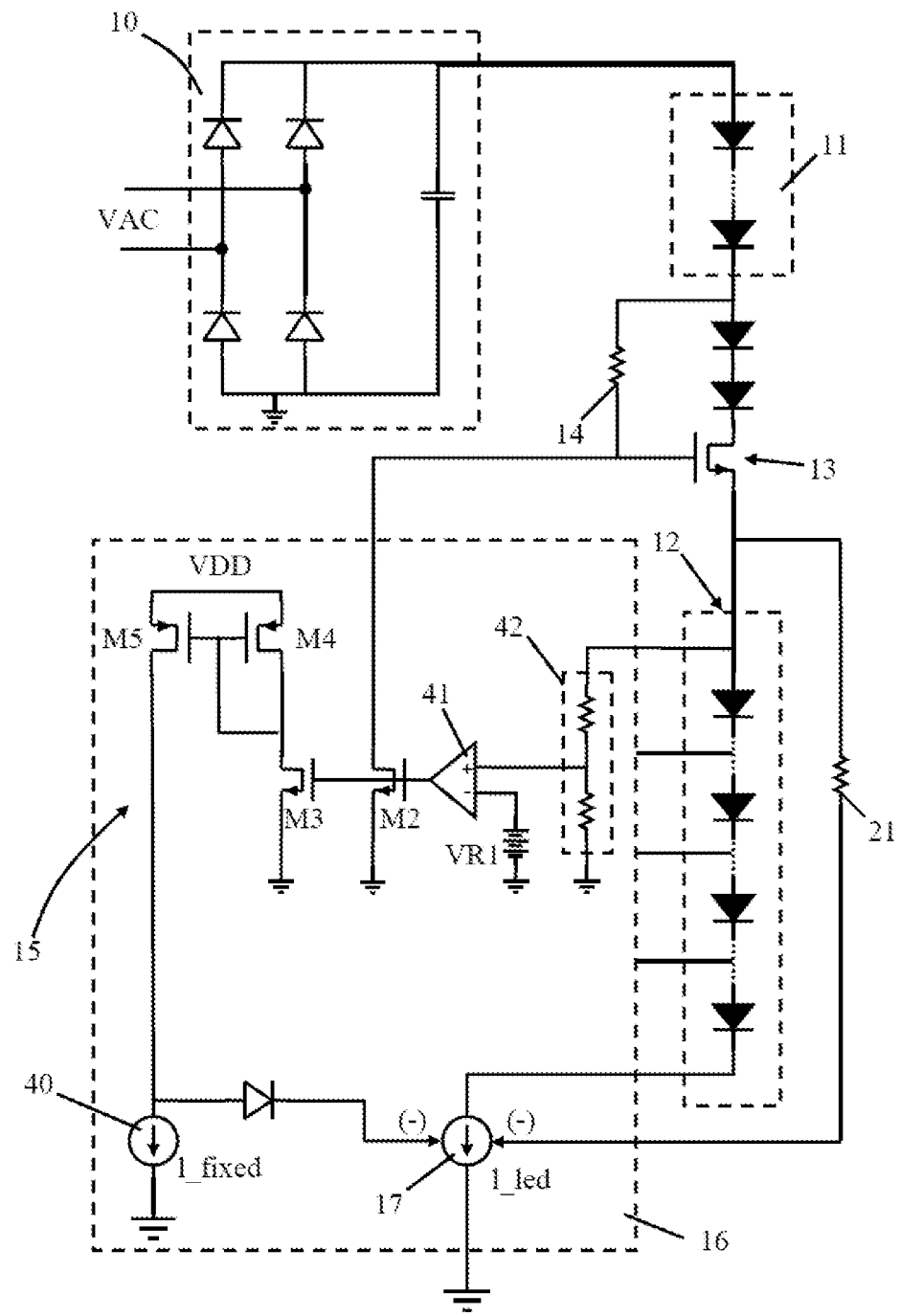
FIG. 4 is a diagram of another embodiment for decreasing LED current based on the embodiment of FIG. 2.

With reference to FIGS. 1 and 4, FIG. 4 is a diagram of another embodiment for decreasing LED current based on the embodiment of FIG. 1. In this embodiment, the zener diode 15, shown in FIG. 1, is integrated into the low voltage LED direct driver 16, a pull-up resistor 14 is connected to a node that is located 2 LEDs above the drain of the high voltage NFET 13. The embodiment further comprises first feedback resistor 21 and a fixed current source 40. The feedback resistor 21 is connected between a source of the high voltage NFET 13 and the current source 17. The power dissipation of the pull-up resistor 14 can be smaller compared to the pull-up resistor 14 shown in FIG. 1. The fixed current source 40 provides a current threshold, above which further increases in the drain voltage of NFET 13 will significantly reduce the LED current.

The control circuitry in FIG. 4 comprises a fixed current source 40, a resistor divider 42, a comparator 41, a reference voltage VR1, a output transistor M2, a passing transistor M3, and a current mirror 43. The resistor divider 42 is connected to the top of the minor string 12 and a positive input of the comparator 41. It is configured for sensing the voltage at the top of the minor string 12. The reference voltage VR1 connects to a negative input of the comparator 41. The output transistor M2 is connected to the gate of high voltage NFET 13. The passing transistor M3 is connected to the output transistor M2. The current mirror 43 is connected between the passing transistor M3 and the fixed current source 40, and comprises a first mirror transistor M4 and a second mirror transistor M5. The first mirror transistor M4 is connected to the passing transistor M3. The second mirror transistor M5 is connected to the fixed current source. The fixed current source 40 connects to the current source 17.

When the voltage at the top of the minor string 12 is higher than the reference voltage VR1 (sensed by the resistor divider 42), the comparator 41 turns on the output transistor M2 and pulls the gate of the high voltage NFET 13 down, thus limiting the maximum voltage at the source of the high voltage NFET 13 (which is also the top of the minor string 12).

The same current flows through the pull-up resistor 14 as flows through the output transistor M2, which is the same current (or directly proportional to) that flows through the passing transistor M3 and the first mirror transistor M4. Since the current mirror 43 is formed by the first mirror transistor M4 and the second mirror transistor M5, the current in the second mirror transistor M5 also matches the current in the first mirror transistor M4.

Accordingly, for voltage at the drain of the high voltage NFET 13, current through the pull-up resistor 14 is proportional to the drain to gate voltage of the high voltage NFET 13. Since the voltage on the gate of the high voltage NFET 13 is roughly constant, the current through the second mirror transistor M5 is proportional to voltage at the drain of the high voltage NFET 13. When the voltage at the drain of the high voltage NFET 13 increases high enough to make the current of the mirror transistor M5 higher than the current of the fixed current source 40, the excess current will then flow into the current source 17 through the blocking diode 44, thereby decreasing the LED current, and controlling the power dissipated by NFET 13 to a reasonable level.

Figure 5:
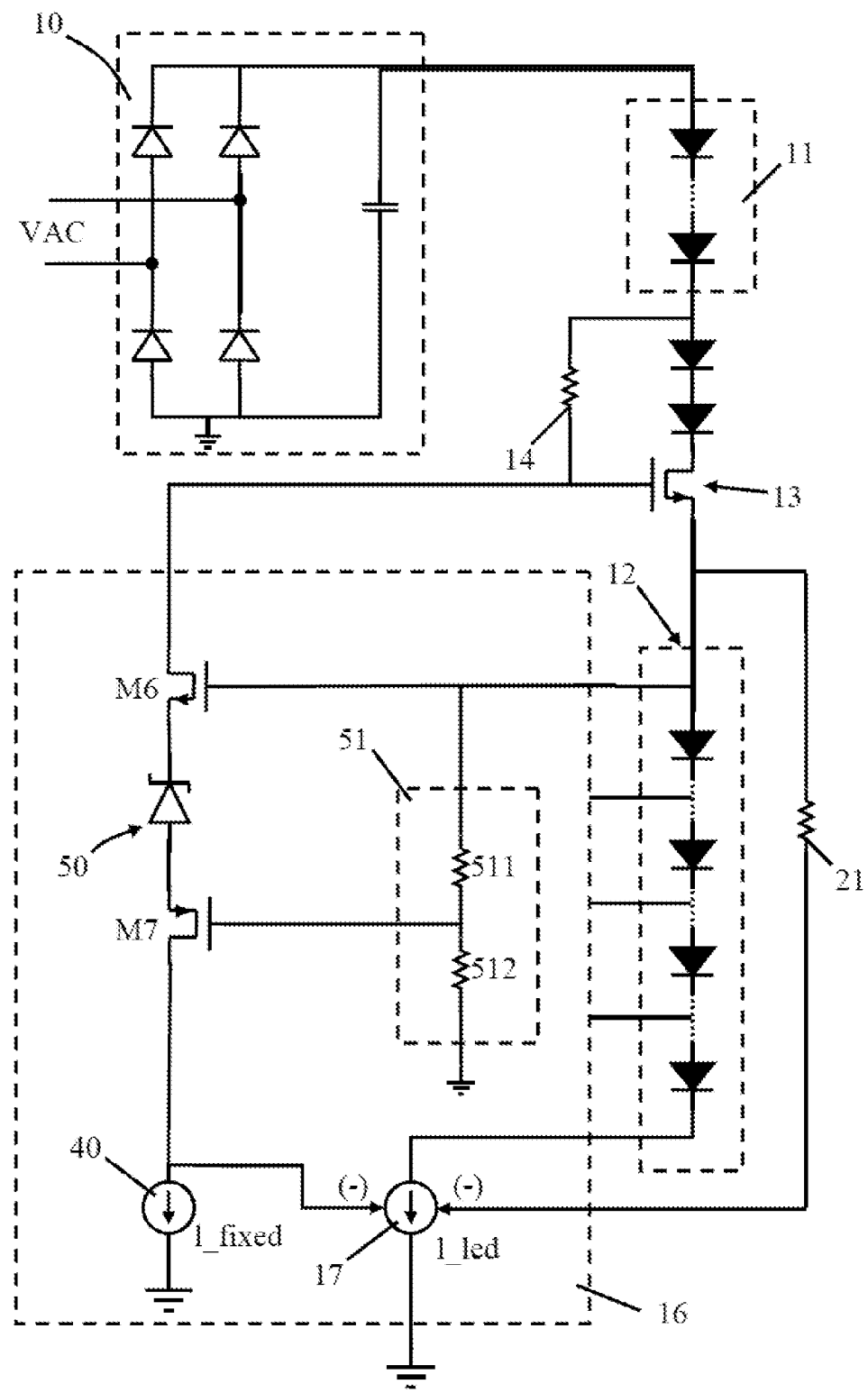
FIG. 5 is a diagram of another embodiment for decreasing LED current based on the embodiment shown in FIG. 4.

With reference to FIGS. 4 and 5, FIG. 5 is a diagram of another embodiment for decreasing LED current based on the embodiment shown in FIG. 4. This embodiment uses a low voltage zener diode integrated in the process, which eliminates the use of the reference voltage VR1 and other required components. The integrated zener diode 15, in this embodiment as shown in FIG. 5, is connected to the fixed current source 40, and comprises a low voltage zener diode 50, a resistor divider 51, a first switching transistor M6 and a second switching transistor M7. A drain of the first switching transistor M6 is connected to the gate of the high voltage NFET 13 and the bottom end of the pull-up resistor 14. The gate of the first switching transistor M6 is connected to the top of the minor string 12. The source of the first switching transistor M6 is connected to a cathode of the low voltage zener diode 50. The resistor divider 51 is connected to the gate of the first switching transistor M6, and comprises a first dividing resistor 511 and a second dividing resistor 512 connected in series. The first dividing resistor is connected to the gate of the first switching transistor M6 and the top of the minor string 12.

A gate of the second switching transistor M7 is connected a intersection of the first dividing resistor 511 and the second dividing resistor 512. The drain of the second switching transistor M7 is connected to the fixed current source 40 and the current source 17. The source of the second switching transistor M7 is connected to the anode of the low voltage zener diode 50.

When the voltage across the first dividing resistor 511 exceeds a sum voltage of threshold voltages of the first switching transistor M6 and the second switching transistor M7, and the breakdown voltage of the low voltage zener diode 50, then current will start to flow through the first switching transistor M6 and the second switching transistor M7 via the low voltage zener diode 50. That current will start to pull down the gate of the high voltage NFET, which regulates voltage at the top of the minor string 12 to some voltage set by the ratio of the first dividing resistor 511 and the second dividing resistor 512. As the drain voltage of NFET 13 continues to increase the current through resistor 14, transistors M6, M7 and zener diode 50 also increases. Eventually the current will exceed the current of fixed current source 40. The excess current will flow into current source 16 causing the LED current to decrease. In this way the power dissipation of NFET 13 is controlled to a safe value.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A device for protecting a low voltage LED direct driver comprising:
  a rectifying stage rectifying an AC input voltage to a pulsating DC voltage;
  a major string, a top end of the major string being connected to the rectifying stage;
  a minor string being connected to the low voltage LED direct driver and a current source integrated inside the low voltage LED direct driver;
  a high voltage NFET, a drain of the high voltage NFET being connected to a bottom end of the major string, and a source of the high voltage NFET being connected to a top of the minor string;
  a pull-up resistor connected between a gate of the high voltage NFET; and
  an avalanche unit, a first end of the avalanche unit being connected to the gate of the high voltage NFET and the pull-up resistor, and a second end of the avalanche unit being connected to the current source of the low voltage LED direct driver, wherein the avalanche unit is connected to a fixed current source and the current source, wherein the avalanche unit comprises:
  a comparator;
  a resistor divider is connected to the top of the minor string and a positive input of the comparator, and is configured for sensing the voltage at the top of the minor string;
  a reference voltage connected to a negative input of the comparator;
  an output transistor connected to the high voltage NFET;
  a passing transistor connected to the output transistor; and
  a current mirror is connected between the passing transistor and the fixed current source, the current mirror comprises
  a first mirror transistor, is connected to the passing transistor; and
  a second mirror transistor is connected to the fixed current source.

2. The device as claimed in claim 1, further comprising an external feedback module comprising
  a turning zener diode, a cathode of the turning zener diode being connected to the drain of the high voltage NFET;
  a first feedback resistor being connected between the source of the high voltage NFET and the current source of the low voltage LED direct driver; and
  a second feedback resistor being connected to the current source of the low voltage LED direct driver.

3. The device as claimed in claim 1, wherein the pull-up resistor is connected to a node that located 2 LED diode drops above a drain of the high voltage NFET.

4. A device for protecting a low voltage LED direct driver comprising:
  a rectifying stage rectifying an AC input voltage to a pulsating DC voltage;
  a major string, a top end of the major string being connected to the rectifying stage;
  a minor string being connected to the low voltage LED direct driver and a current source integrated inside the low voltage LED direct driver;
  a high voltage NFET, a drain of the high voltage NFET being connected to a bottom end of the major string, and a source of the high voltage NFET being connected to a top of the minor string;
  a pull-up resistor connected between a gate of the high voltage NFET; and
  an avalanche unit, a first end of the avalanche unit being connected to the gate of the high voltage NFET and the pull-up resistor, and a second end of the avalanche unit being connected to the current source of the low voltage LED direct driver, wherein the avalanche unit is connected to a fixed current source and the current source, and comprises
  a low voltage zener diode;
  a first switching transistor, a drain of the first switching transistor is connected to the gate of the high voltage NFET and the bottom end of the pull-up resistor, a gate of the first switching transistor is connected to the top of the minor string, and a source of the first switching transistor is connected to a cathode of the low voltage zener diode;
  a resistor divider is connected to the gate of the first switching transistor, and comprises a first dividing resistor and a second dividing resistor connected in series, and the first dividing resistor is connected to the gate of the first switching transistor and the top of the minor string; and
  a second switching transistor, a gate of the second switching transistor is connected a intersection of the first dividing resistor and the second dividing resistor, a drain of the second switching transistor is connected to the fixed current source and the current source, and a source of the second switching transistor is connected to the anode of the low voltage zener diode.

* * * * *